United States Patent
Yang

(10) Patent No.: US 10,003,504 B2
(45) Date of Patent: Jun. 19, 2018

(54) MANAGEMENT DEVICE

(71) Applicant: HONGFUJIN PRECISION ELECTRONICS(TIANJIN)CO., LTD., Tianjin (CN)

(72) Inventor: Meng-Liang Yang, Shenzhen (CN)

(73) Assignee: HONGFUJIN PRECISION ELECTRONICS(TIANJIN) CO., LTD., Tianjin (CN)

( * ) Notice: Subject to any disclaimer, the term of this patent is extended or adjusted under 35 U.S.C. 154(b) by 219 days.

(21) Appl. No.: 14/950,628

(22) Filed: Nov. 24, 2015

(65) Prior Publication Data

US 2017/0111238 A1 Apr. 20, 2017

(30) Foreign Application Priority Data

Oct. 20, 2015 (CN) .......................... 2015 1 0678442

(51) Int. Cl.
*G06F 11/00* (2006.01)
*H04L 12/24* (2006.01)
*G06F 11/07* (2006.01)

(52) U.S. Cl.
CPC .......... *H04L 41/24* (2013.01); *G06F 11/0706* (2013.01); *G06F 11/0709* (2013.01); *H04L 41/06* (2013.01)

(58) Field of Classification Search
CPC ............................ H04L 41/06–41/0627; H04L 41/0654–41/0695; G06F 11/07; G06F 11/0706; G06F 11/0709; G06F 11/0727
See application file for complete search history.

(56) References Cited

U.S. PATENT DOCUMENTS

| | | | | |
|---|---|---|---|---|
| 6,697,897 B1* | 2/2004 | Friel | ..................... | H04L 5/1423 709/209 |
| 8,099,624 B1* | 1/2012 | Saxena | ............... | G06F 11/0727 714/5.11 |
| 2003/0107400 A1* | 6/2003 | Kumamoto | ...... | H03K 19/17736 326/38 |
| 2004/0010590 A1* | 1/2004 | Manzano | .............. | G06F 9/5055 709/224 |
| 2004/0177187 A1* | 9/2004 | Merkin | ............... | G06F 13/4031 710/107 |
| 2005/0050272 A1* | 3/2005 | Behrens | .................... | G06F 1/18 711/114 |
| 2006/0288414 A1* | 12/2006 | Kuroda | ................. | G06F 21/567 726/24 |

* cited by examiner

*Primary Examiner* — Brendan Higa
(74) *Attorney, Agent, or Firm* — ScienBiziP, P.C.

(57) ABSTRACT

A management device includes a first server, a first control module, a management module connected to the first control module through the first server; and a first executing module connected to the first control module. When the first server is operating normally, the first server outputs a first signal to the first control module, the first control module controls the first executing module to operate corresponding to the first signal. When the first server is operating abnormally, the management module outputs a second signal, the first control module controls the first executing module to operate corresponding to the second signal.

6 Claims, 1 Drawing Sheet

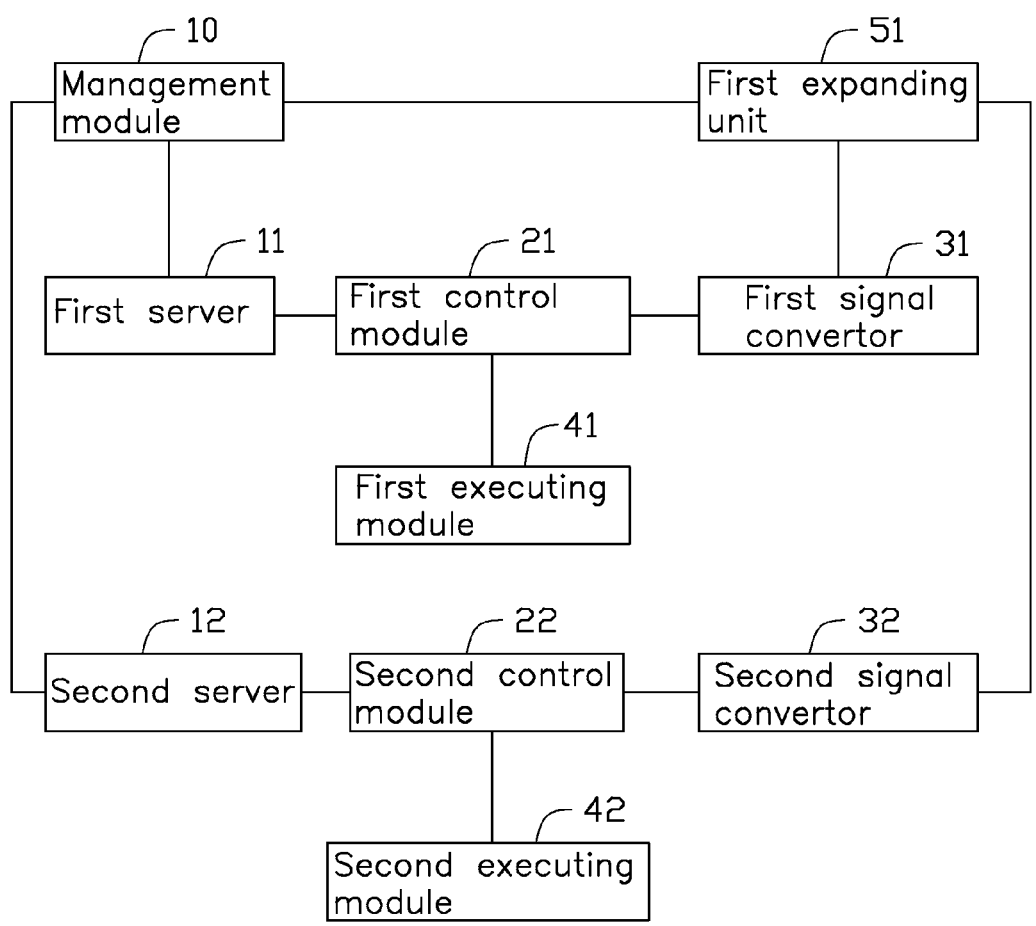

MANAGEMENT DEVICE

FIELD

The subject matter herein generally relates to a management device for servers.

BACKGROUND

A rack can have many servers. A server can manage many processing units. When one of other parts of the server stops operating by faults, the processing units may stop operating.

BRIEF DESCRIPTION OF THE DRAWINGS

Implementations of the present technology will now be described, by way of example only, with reference to the attached figures.

The FIGURE is a block diagram of an embodiment of the management device of the present disclosure.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently coupled or releasably coupled. The term "comprising," when utilized, means "including, but not necessarily limited to"; it specifically indicates open-ended inclusion or membership in the so-described combination, group, series and the like. The term "operating normally," means "operating ordinarily" or "operating with no errors".

The disclosure will now be described in relation to a management device for servers.

The FIGURE shows an embodiment of a management device 100 for servers. The management device 100 can comprise a management module 10, a first server 11, a second server 12, a first control module 21, a second control module 22, a first signal convertor 31, a second signal convertor 32, a first executing module 41, a second executing module 42, and a first expanding unit 51.

The management module 10 is coupled to the first control module 21 through the first server 11. The management module 10 is coupled to the second control module 22. The management module 10 is coupled to the first signal convertor 31 through the first expanding unit 51. The control module is coupled to the second signal convertor 32 through the first expanding unit 51.

The first control module 21 is coupled to the first signal convertor 31 and the first executing module 41.

The second control module 22 is coupled to the second signal convertor 31 and the second executing module 42.

In the present embodiment, the first server 11 outputs a first signal to the first control module 21 when the first server 11 is operating normally. The first control module 21 controls the first executing module 41 to operate corresponding to the first signal. The management module 10 outputs a second signal when the first server 11 is operating abnormally. The management module 10 outputs the second signal to the expanding unit 51 through intelligent platform management bus. The expanding unit 51 transmits the second signal to the first signal convertor 31. The first signal convertor 31 converts the second signal into a third signal and outputs the third signal to the first control module 21. The first control module 21 controls the first executing module 41 to operate corresponding to the third signal.

In other embodiments, the first control module 21 can control the first executing module 41 to operate when the first control module 21 receives the second signal from the management module 10.

In the present embodiment, the management module 10 is coupled to the first server 11 through inter-integrated circuit bus. The management module 10 receives signals from the first server 11 to check if the first server 11 is operating normally. When the first server 11 is operating normally, the management module 10 gives a higher priority to the first server 11. Thus the first server 11 can control the first control module 21. When the first server 11 is operating abnormally, the management module 10 gives a lower priority to the first server 11. Thus the first server 11 cannot control the first control module 21. The management module 10 controls the first control module 21 directly.

In other embodiments, sometimes both of the management module 10 and the first server 11 send control signals to the first control module 21. The control module 21 can distinguish which control signal is later in sequence and choose the later one as the control signal.

Similarly, the second server 12 outputs a fourth signal to the second control module 22 when the second server 12 is operating normally. The second control module 22 controls the second executing module 42 to operate when the second control module 22 receives the fourth signal. When the second server 12 is operating abnormally, the management module outputs a fifth signal. The second control module 22 controls the second executing module 42 when the management module outputs the fifth signal.

In the present embodiment, the management module 10 outputs the fifth signal to the first expanding unit 51. The first expanding unit 51 transmits the fifth signal to the second signal convertor 32. The second signal convertor 32 converts the fifth signal into a sixth signal and outputs the sixth signal to the second control module 22. The second control module 22 controls the second executing module 42 corresponding to the sixth signal.

In the present embodiment, the management module 10 is coupled to the second server 12 through inter-integrated circuit bus. The management module 10 receives signals from the second server 12 to check if the second server 12 is operating normally. When the second server 12 is operating normally, the management module 10 gives a higher priority to the second server 12. Thus the second server 12 can control the second control module 22. When the second server 12 is operating abnormally, the management module 10 gives a lower priority to the second server 12. Thus the second server 12 cannot control the second control module 22. The management module 10 controls the second control module 22 directly.

In other embodiments, sometimes both of the management module 10 and the second server 12 send control signals to the second control module 22. The control module 21 can distinguish which control signal is later in sequence and choose the later one as the control signal.

In the present embodiment, the management module is a controller of a rack of servers. The controller is used to control the first server 11 and the second server 12. The first executing module 41 comprises a first processor, and the second executing module 42 comprises a second processor.

In the present embodiment, the first expanding unit 51 comprises an expanding unit of inter-integrated circuit bus. The expanding unit is used to expand the inter-integrated circuit bus. The first control module 21 comprises a first complex programmed logic chip. The second control module 22 comprises a second complex programmed logic chip. The first signal convertor 31 and the first signal convertor 32 are used to convert signal of inter-integrated circuit bus into signals which can be processed by the first complex programmed logic chip and the second complex programmed logic chip.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A management device, comprising:
    a first server;
    a first complex programmed logic chip;
    a controller of a rack coupled to the first complex programmed logic chip through the first server; and
    a first processor coupled to the first complex programmed logic chip;
    wherein when the first server is operating normally, the first server outputs a first signal to the first complex programmed logic chip, the first complex programmed logic chip controls the first processor to operate corresponding to the first signal;
    wherein when the first server is operating abnormally, the controller of the rack outputs a second signal, the first complex programmed logic chip controls the first processor to operate corresponding to the second signal; and
    wherein when the first processor receives signals from the controller of the rack and the first server, the first processor distinguishes which signal is later in sequence.

2. The management device as claim 1, further comprising a first signal convertor, wherein the first signal convertor is coupled to the controller of the rack and the first complex programmed logic chip, the first signal convertor is used to convert the second signal into a third signal and outputs the third signal to the first complex programmed logic chip, the first complex programmed logic chip controls the first processor corresponding to the third signal.

3. The management device as claim 2, wherein the controller of the rack transmits signals to the first signal convertor through inter-integrated circuit bus.

4. The management device as claim 1, wherein the controller of the rack checks if the first server is operating normally, when the first server is operating normally, the controller of the rack gives a higher priority to the first server, the first server can control the first complex programmed logic chip, when the first server is operating abnormally, the controller of the rack give a lower priority to the first server, thus the first server cannot control the first complex programmed logic chip, the controller of the rack controls the first complex programmed logic chip.

5. The management device as claim 1, wherein when the first processor receives signals from the controller of the rack and the first server, the first processor distinguishes which signal is later in sequence and chooses the later signal as a control signal.

6. The management device as claim 1, further comprising a second server and a second processor, wherein when the second server is operating normally, the second server controls the second processor, when the second server is operating abnormally, the controller of the rack controls the second processor.

* * * * *